(12) United States Patent  (10) Patent No.: US 9,253,420 B2
Nystrom et al.  (45) Date of Patent: Feb. 2, 2016

(54) HYPERSPECTRAL SINGLE PIXEL IMAGER WITH FABRY PEROT FILTER

(71) Applicant: Xerox Corporation, Norwalk, CT (US)

(72) Inventors: Peter J. Nystrom, Webster, NY (US);
Lalit K. Mestha, Fairport, NY (US);
Edgar A. Bernal, Webster, NY (US);
Xuejin Wen, Fairport, NY (US); Peter Gulvin, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/178,904

(22) Filed: Feb. 12, 2014

(65) Prior Publication Data

US 2015/0229851 A1    Aug. 13, 2015

(51) Int. Cl.
*H04N 5/33* (2006.01)
*G02B 5/20* (2006.01)
*H04N 5/335* (2011.01)

(52) U.S. Cl.
CPC ............. *H04N 5/332* (2013.01); *G02B 5/204* (2013.01); *H04N 5/335* (2013.01)

(58) Field of Classification Search
CPC ......... H04N 5/332; H04N 5/335; G02B 5/204
USPC ........................................................ 348/342
See application file for complete search history.

(56) References Cited

U.S. PATENT DOCUMENTS

| 8,199,244 | B2 | 6/2012 | Baraniuk et al. | |
| 2005/0030545 | A1* | 2/2005 | Tuschel et al. | 356/454 |
| 2007/0153288 | A1* | 7/2007 | Wang et al. | 356/454 |
| 2010/0213376 | A1* | 8/2010 | Gardner et al. | 250/339.07 |
| 2012/0200682 | A1* | 8/2012 | Mestha et al. | 348/61 |
| 2013/0079649 | A1 | 3/2013 | Mestha et al. | |

OTHER PUBLICATIONS

U.S. Appl. No. 13/528,307, filed Jun. 20, 2012, Kyal et al.
U.S. Appl. No. 13/871,728, filed Apr. 26, 2013, Kyal et al.
U.S. Appl. No. 13/483,992, filed May 30, 2012, Mestha et al.
U.S. Appl. No. 13/842,027, filed Mar. 15, 2013, Bernal et al.
U.S. Appl. No. 14/037,847, filed Sep. 26, 2013, Bernal et al.
Duarte, Marco F. et al., "Single-Pixel Imaging via Compressive Sampling", IEEE Signal Processing Magazine, vol. 83, Mar. 2008, pp. 1-19.

(Continued)

*Primary Examiner* — Gevell Selby
(74) *Attorney, Agent, or Firm* — Fay Sharpe LLP

(57) ABSTRACT

A method is provided for using a single-pixel imager in order to spatially reconstruct an image of a scene. The method can comprise the following: configuring a light filtering device including an array of imaging elements to a spatially varying optical filtering process of incoming light according to a series of spatial patterns corresponding to sampling functions. The light filtering device can be a transmissive filter including a first membrane, a second membrane, and a variable gap therebetween. The method further comprises tuning a controller for manipulating a variable dimension of the gap; and, measuring, using a photodetector of the single-pixel imager, a magnitude of an intensity of the filtered light across pixel locations in the series of spatial patterns. The magnitude of the intensity can be equivalent to an integral value of the scene across the pixel locations.

9 Claims, 4 Drawing Sheets

(56) References Cited

OTHER PUBLICATIONS

Candès, Emmanuel J., "Compressive sampling", Proceedings of the International Congress of Mathematicians, Madrid, Spain 2006, pp. 1433-1452.

Smith, John L., "The Pursuit of Noninvasive Glucose: Hunting the Deceitful Turkey", Second Edition: Revised and Expanded, Parts Copyright 2011 by John L. Smith, pp. 1-134, http://www.mendosa.com/noninvasive_glucose.pdf.

* cited by examiner

HYPERSPECTRAL SINGLE PIXEL IMAGER WITH FABRY PEROT FILTER

BACKGROUND

Digital cameras in the megapixel range are commonplace due to the fact that silicon, the semiconductor material of choice for large-scale electronics integration, readily converts photons at visual wavelengths into electrons. On the other hand, imaging outside the visible wavelength range is considerably more expensive. Hyperspectral and multispectral imaging have a wide range of applications. Current embodiments of hyperspectral imaging systems are bulky, expensive and relatively slow. Single pixel imaging systems can offer unique advantages, including significant cost savings, but maintaining a broad spectral response can create a somewhat more complex optical path requiring additional splitters, mirrors, and filters.

Present single-pixel camera architectures can compute pseudo-random linear measurements of a scene under view and reconstruct the image of the scene from the measurements. Scene under view can comprise light emanating from the object under view, where emanating can refer to radiating, transmitting, refracting, and/or reflecting from the object under view. The pseudo-random linear measurements are inner products between an N-pixel sampled version of the incident light field from the scene and a set of two-dimensional sampling functions. The inner product can be implemented via a digital micromirror device (DMD) consisting of a two-dimensional array of N mirrors that reflect the light towards only a single photodetector or away from it. The photodetector integrates the incoming light and converts it to an output voltage that is related to the magnitude of the inner product between the scene and the sampling function according to which the DMD is configured. Reconstruction of the image is possible by judicious processing of the set of estimated inner product values. One of the main limitations of the above described single-pixel camera architecture is that it is restricted to a single wavelength band.

BRIEF DESCRIPTION

A method for using a single-pixel imager in order to spatially reconstruct an image of a scene can comprise the following: configuring a light filtering device including an array of imaging elements to a spatially varying optical filtering process of incoming light according to a series of spatial patterns corresponding to sampling functions. The light filtering device can be a transmissive filter including a first membrane, a second membrane, and a variable gap therebetween. The method further comprises tuning a controller for manipulating a variable dimension of the gap; and, measuring, using a photodetector of the single-pixel imager, a magnitude of an intensity of the filtered light across pixel locations in series of spatial patterns. The magnitude of the intensity can be equivalent to an integral value of the scene across the pixel locations. The integral value can comprise an inner product. The first membrane can include a first reflective coating and the second membrane can include a second reflective coating. The first reflective coating and the second reflective coating face one another with the variable gap therebetween. The tuning of the controller and the gap can define a dimension having a resultant associated wavelength band transmission for controlling multi-spectral imaging. The associated wavelength band transmission can be controlled by the gap and a first selected gap can define or determine a first wavelength band of the wavelength band transmission. At least a second selected gap can define or determine at least a second wavelength band of the wavelength band transmission.

The light filtering device can be a transmissive F-P filter. The F-P filter can have a first membrane, a second membrane, and a variable gap therebetween. The method further comprises tuning a controller for manipulating a variable dimension of the variable gap; and, measuring, using a photodetector of a single-pixel imager, a magnitude of an intensity of the filtered light across the active pixels. The first membrane can include a first reflective coating and the second membrane can include a second reflective coating. The first reflective coating and the second reflective coating face one another with the variable gap therebetween. The tuning of the controller and the variable gap defines a dimension having a resultant associated wavelength band transmission for controlling multi-spectral imaging. The associated wavelength band transmission is controlled by the variable gap and a first selected gap defines a first wavelength band of the wavelength band transmission; and, the at least a second selected gap defines at least a second wavelength band of the wavelength band transmission, etc. In addition, the method for using a single-pixel imager in order to spatially reconstruct a localized area of interest can further comprise the following: processing a spatially reconstructed scene to identify pixels associated with a localized area of interest in the scene as being active, with pixels outside the localized area being inactive pixels; and, configuring a light filtering device comprising an array of imaging elements to filter incoming light according to a spatial pattern corresponding to the active pixels. The measurement can be equivalent to integrating across the active pixels to generate an integral value thereof. The integral value can comprise a spot measurement of the localized area of interest.

DETAILED DESCRIPTION

To be described in more detail hereinafter, the present disclosure provides for a system which interposes an addressable matrix array of Fabry-Perot (F-P) filter elements into an optical path between primary lens elements and a broadband detector element. A control system computes the state of the filter array, applies the proper signals, and records the value received by the detector. Using algorithms for inverse signal recovery, the recorded sequence can be decoded into an image containing spectral and spatial information.

Figure 1:
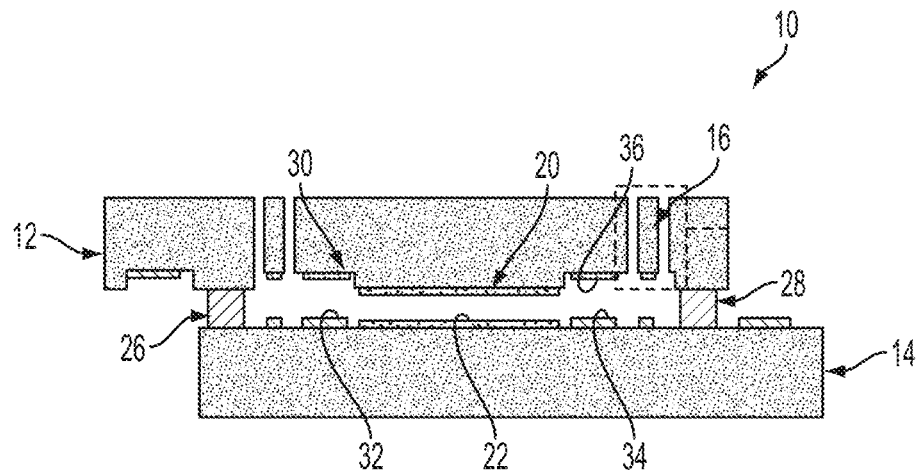
FIG. 1 is a cross-sectional view of an exemplary Fabry-Perot (F-P) filter element.
Figure 2:
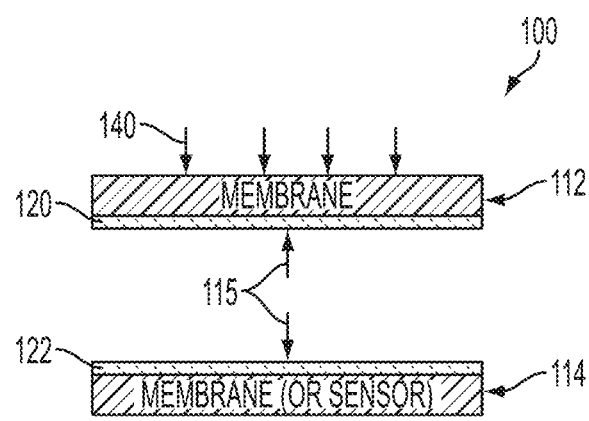
FIG. 2 is a cross-sectional view of an exemplary F-P filter element according to the present disclosure.

FIGS. 1 and 2 illustrate cross-sectional views of exemplary F-P filters 10,100 utilizing a basic F-P structure. The F-P filter arrays 10,100 shown in FIGS. 1 and 2 provide for transmissive addressable filter elements capable of being driven at a pixel level to pass or reject specific wavelengths of interest thus allowing creation of a multitude of multi/hyper-spectral capabilities. In the context of this disclosure, the terms 'spatial filtering' and 'spatially filter' refer to this spatially varying optical filtering process, whereby the bandpass or bandreject nature of the transmission associated with the filter array can be adjusted on a pixel-by-pixel basis. FIG. 1 displays elements comprising the F-P array 10. Namely, moving silica or quartz/glass plates or substrates 12, 14, a spring 16, reflective metal coatings 20, 22, spacers 26, 28, and metal for actuation 30,32,34,36.

An exemplary filter 100, according to the present disclosure, for the basic F-P structure is displayed in FIG. 2 and can be defined as follows:

$$\Delta^2 E - \mu\varepsilon \frac{\partial^2 E}{\partial \tau^2} = 0$$

$$\Delta^2 H - \mu\varepsilon \frac{\partial^2 H}{\partial \tau^2} = 0$$

It is to be appreciated that tangential components of E are continuous from one layer to another and tangential components of H are continuous from one layer to another. The exemplary filter 100 for the F-P structure, as shown in FIG. 2, provides for a pair of membranes or sensors 112,114 spaced from one another. The membranes 112,114 can comprise basically two thin, reasonably transparent membranes, including a variable or predeterminable gap 115 therebetween. The membranes can be coated with a reflective coating 120,122. The gap 115 can be set to a spacing that relates to a particular wavelength. The direction of incident light 140 is also shown in the figure.

Figure 3:
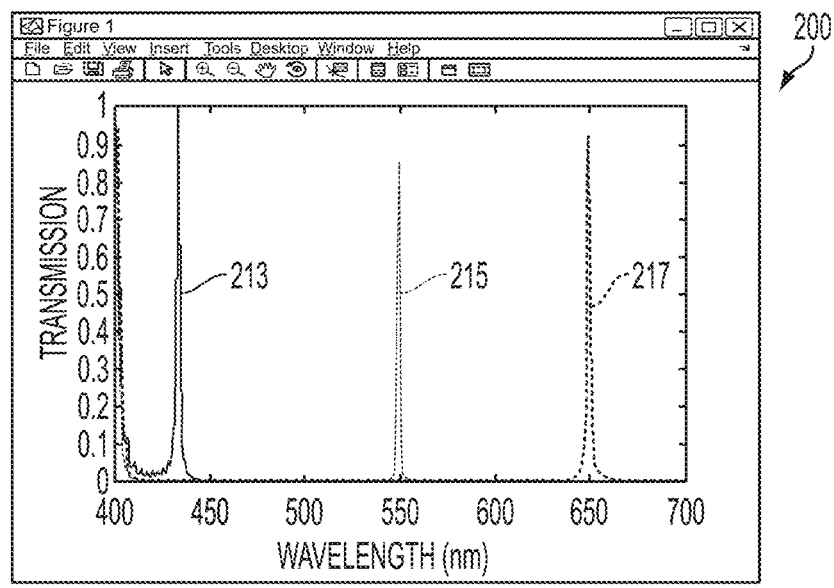
FIG. 3 is a graphical representation of a resultant wavelength band reflective of a gap spacing.

As shown in FIG. 3, modeling of these devices can demonstrate favorable filter performance and bandwidth 200. It is to be appreciated that a particular or predetermined gap will result in a particular band pass filter. In one particular arrangement, the gap 115 can be selected such that it results in a transmittal of green light at 550 nanometers 215. Referring again to FIG. 3, F-P transmission spectra 213, 215, 217 for three different gap sizes (not illustrated) using gold reflective coating or film 120,122 of silica plates 112,114 are displayed. Dependent upon different gap sizes (not illustrated), a resultant associated F-P transmission spectra 213, 215, 217 is realized. As the gap 115 is filtered or varied, the resulting transmittal of light can be at different wavelengths 213,215,217 corresponding to, for example, 430 nm (blue), 550 nm (green), and 650 nm (red), respectively.

Figure 4:
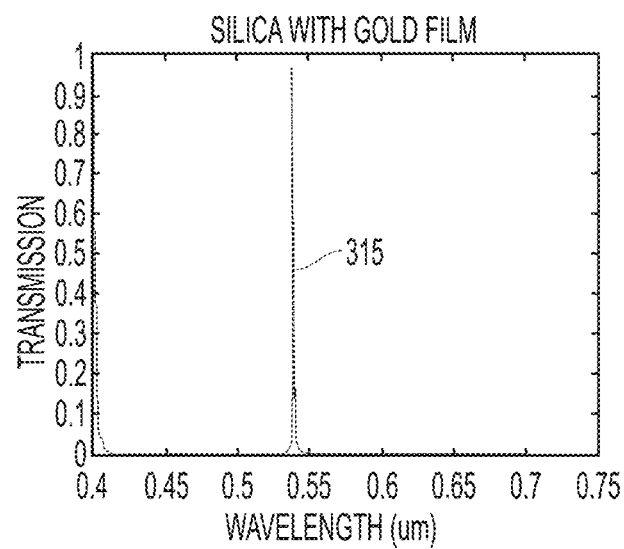
FIG. 4 is a graphical representation of resultant wavelength bands corresponding to several predeterminable gap spacings.
Figure 5:
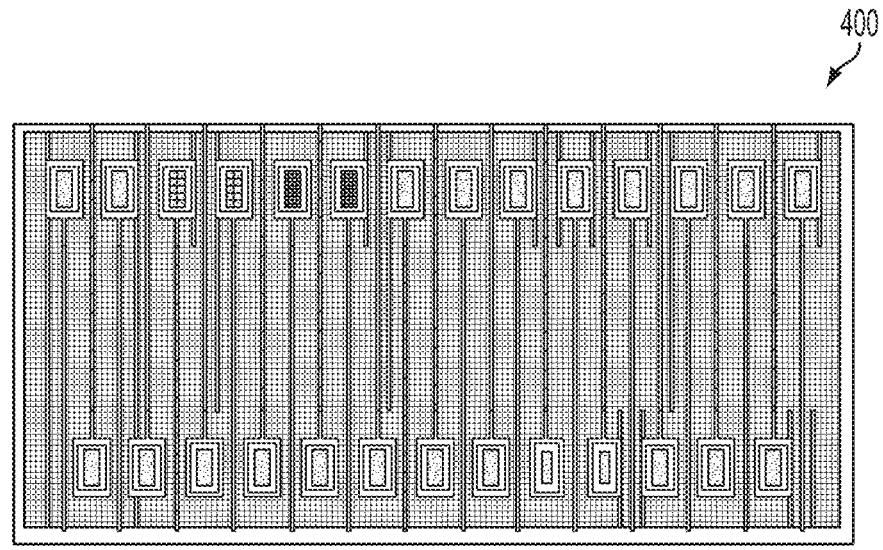
FIG. 5 is an exemplary one-dimensional (1D) linear array for a spectrometer-like application of the 1D array.

A narrow variable band transmission 315, as shown in FIG. 4, can be an element for enabling a hyper-spectral imager. Broad discrete pass bands lead to slightly less favorable multi-spectral imagers. Also shown in FIG. 4, the same gap could result in multiple transmission wavelengths. Extra low pass and high pass filters need to be integrated in the system to avoid the contamination from unwanted transmission wavelength. The low pass and long pass filter could either appear as individual components or as deposited films on other components such as the photodetector. By assembling addressable devices into an array, the filter functions can be applied on a pixel-by-pixel basis. An example of a one-dimensional (1D) linear array 400 is shown in FIG. 5. FIG. 5 displays an array for a spectrometer-like application of the 1D array.

Figure 6:
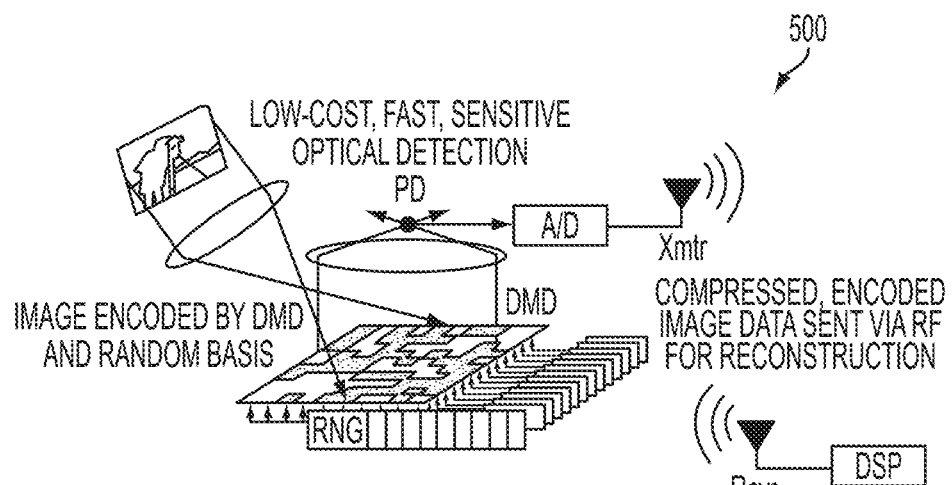
FIG. 6 is an illustrative diagram of a single-pixel camera for a reflective/mirror based system utilizing a digital micromirror device (DMD) array; and, FIG. 7 is an illustrative diagram for a transmissive system utilizing an F-P transmissive filter array.

Referring now to FIG. 6, a traditional single-pixel camera 500 can comprise the following modules: a light source for illuminating an object/scene to be captured; a lens for projecting an image of the object onto a digital micromirror device (DMD); the DMD can perform pixel-wise multiplication between incoming light and a set of predetermined sampling functions; a collector lens for focusing the light reflected from the DMD pixel-wise multiplication onto the photodetector; the photodetector measures a magnitude of the inner product in the form of light intensity and converts it to voltage; and, a processing unit for reconstructing the scene from inner product measurements as the various basis functions are applied over time. FIG. 6 provides for an existing DMD reflective device that casts an image onto a mirror surface and then reflects that image.

Data processing includes the use of compressive sampling algorithms to reconstruct the image using digitized signals from the photodiode. If $x[\cdot]$ denotes the N-pixel sampled version of the image scene and $\phi_m[\cdot]$ the m-th sampling function according to which the DMD is configured; then, each measurement performed by the photodetector corresponds to the inner product $y_m = \langle x, \phi_m \rangle$. The mirror orientations corresponding to the different basis functions are typically chosen using pseudorandom number generators (e.g., iid Gaussian, iid Bernoulli, etc.) that produce patterns with close to 50% fill factor. In other words, at any given time, about half of the micromirrors in the DMD array are oriented towards the photodetector while the complementary fraction is oriented away from it. By making the sampling functions pseudorandom, the N-pixel sampled scene image $x[\cdot]$ can typically be reconstructed with significantly fewer samples than those dictated by the Nyquist sampling theorem (i.e., the image can be reconstructed after M inner products, where M<<N). In the DMD arrangement, N is the total number of mirrors. In the F-P filter array arrangement, N is the total number of cells in the filter array.

Figure 7:
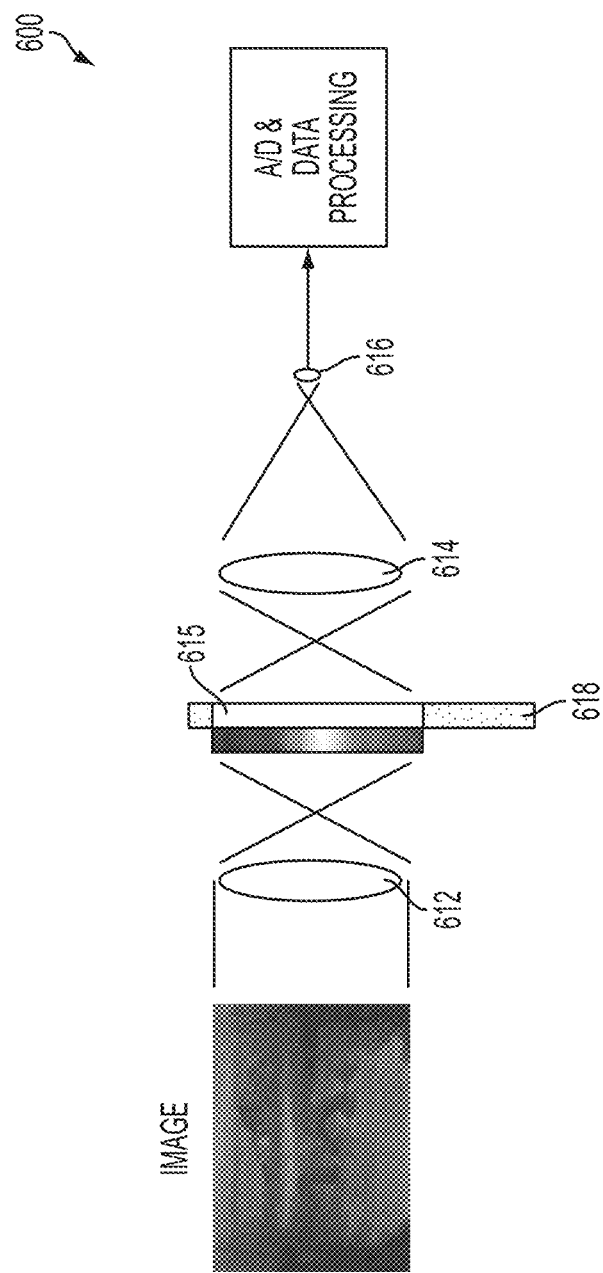

Implementing the aforementioned DMD can be used to create binary patterns used to encode incident radiation onto an optical detector. One embodiment is shown in FIG. 7 which provides an illustrative diagram of an F-P array filter 600 (i.e., transmissive filter), that takes the place of a reflective DMD array. Although not illustrated, another arrangement could include a combination of a reflective DMD array with an F-P array filter 600. In this case, the inner products between the sampling functions and the sampled image of the scene are enabled by the aforedescribed process of spatial filtering, which enables pixel-level control of the transmissivity associated with the elements of the filter array. It is to be appreciated that in the transmissive system, as opposed to a reflective/mirror-based system, there is an advantage in packaging the various elements. In particular, a pair of lenses 612, 614, and a detector 616 can be packaged in a smaller footprint, thus leading to reduced costs and improved manufacturing tolerances. Furthermore, if an image reconstruction is required at a different wavelength within the F-P filter range, a controller 618 can tune the gaps 615 (115) (i.e., vary the spacing between the sensors) to transmit the light at a second or different wavelength; thus, enabling a controlled way to generate multi/hyper-spectral imaging capability. FIG. 7 illustrates a transmission-based device but instead of having mirrors that are essentially turned on and off, the device includes individual pixel elements or filters that can be tuned to collections of different spectral. It is to be appreciated that the F-P array filter 600 can be integrated with the single-pixel camera 500 to realize a single-pixel hyper spectral imaging system (not illustrated).

A hybrid switching mode for spatial and spot/area measurements can be implemented to switch from spatial scene reconstruction to spot measurement mode.

In some services-driven businesses, the ability to provide low cost detection for disease or health-related conditions can be an enabler for a variety of layered offerings. By being able to tailor the hardware to suit various needs, a wide variety of applications can be accommodated (i.e., transportation, security, verification, performance, et al.) The potential applications can be significantly enhanced by using more than one wavelength band. The single-pixel camera with an F-P filter not only reduces the cost of sensing an image by using one detector instead of an array of detectors, but also provides abilities to sweep the wavelengths in a controlled manner to create a multi/hyper-spectral regime. This may also be used in a tunable fashion when individual filter wavelengths are desired and where filters are able to be adjusted (i.e., gaps tuned) to achieve said wavelengths. The varying or adjusting of the spacing between the sensors or semi-transparent plates can be accomplished using either capacitors, piezos, or some other micromechanical type motions to tune the gap. By setting the gap, one particular arrangement can reinforce a particular wavelength and because it is tuned to that wavelength it also allows the wavelength band to pass through unencumbered where the other ones tend to destructively interfere with each other and the amplitude of their transmission is seriously reduced (i.e., an interference cavity). If image reconstruction is desired at a different wavelength within the F-P filter range, the controller can tune the gap accordingly.

A method for using the single-pixel imager in order to spatially reconstruct an image of a scene described above can comprise the following: configuring a light filtering device comprising an array of imaging elements to a spatially varying optical filtering process of incoming light according to a series of spatial patterns corresponding to sampling functions. The light filtering device can be a transmissive filter including a first membrane, a second membrane, and a variable gap therebetween. The method further comprises tuning a controller for manipulating a variable dimension of the gap; measuring, using a photodetector of the single-pixel imager, a magnitude of an intensity of the filtered light across pixel locations in the series of spatial patterns; wherein the magnitude of an intensity is equivalent to an integral value of the scene across the pixel locations. The integral value can comprise an inner product. The first membrane can include a first reflective coating and the second membrane can include a second reflective coating. The first reflective coating and the second reflective coating face one another with the variable gap therebetween. The tuning of the controller and the gap can define a dimension having a resultant associated wavelength band transmission for controlling multi-spectral imaging. The associated wavelength band transmission can be controlled by the gap and a first selected gap can define or determine a first wavelength band of the wavelength band transmission. At least a second selected gap can define or determine at least a second wavelength band of the wavelength band transmission.

The light filtering device can be a transmissive F-P filter. The method further comprises tuning a controller for manipulating a variable dimension of the variable gap; and, measuring, using a photodetector of a single-pixel imager, a magnitude of an intensity of the filtered light across the active pixels. The first membrane can include a first reflective coating and the second membrane can include a second reflective coating. The first reflective coating and the second reflective coating face one another with the variable gap therebetween. The tuning of the controller and the variable gap defines a dimension having a resultant associated wavelength band transmission for controlling multi-spectral imaging. The associated wavelength band transmission is controlled by the variable gap and a first selected gap defines a first wavelength band of the wavelength band transmission; and, the at least a second selected gap defines at least a second wavelength band of the wavelength band transmission, etc. In addition, the method for using a single-pixel imager in order to spatially reconstruct a localized area of interest can further comprise the following: processing a spatially reconstructed scene to identify pixels associated with a localized area of interest in the scene as being active, with pixels outside the localized area being inactive pixels; and, configuring a light filtering device comprising an array of imaging elements to filter incoming light according to a spatial pattern corresponding to the active pixels. The measurement can be equivalent to integrating across the active pixels to generate an integral value thereof. The integral value can comprise a spot measurement of the localized area of interest.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for using a single-pixel imager to reconstruct the spatial appearance of a scene, the method comprising:
configuring a light filtering device comprising an array of imaging elements to a spatially varying optical filtering process of incoming light according to a series of spatial patterns corresponding to a series of sampling functions that enable spatial reconstruction of an image of the scene;
said light filtering device is a transmissive filter including a first membrane, a second membrane, and a variable gap therebetween;
tuning a controller for manipulating a variable dimension of said gap;
measuring, using a single photodetector of the single-pixel imager, a magnitude of an intensity of said filtered light across pixel locations in said series of spatial patterns;
reconstructing an image of the scene from a sequence of intensity values;
wherein said tuning of said controller and said gap defines a dimension having a resultant associated wavelength band transmission for controlling multi-spectral imaging;
wherein a first associated wavelength band transmission is controlled by a first selected gap defining a first wavelength band of said wavelength band transmission to said single photodetector; and,
wherein a second associated wavelength band transmission is controlled by at least a second selected gap defining a subsequent at least a second wavelength band of said wavelength band transmission to same said single photodetector.

2. The method of claim 1, further comprising:
said transmissive filter is a Fabry-Perot (F-P) filter;
said first membrane includes a first reflective coating and said second membrane includes a second reflective coating; and,
said first reflective coating and said second reflective coating face one another with said variable gap therebetween.

3. The method of claim 1, wherein the series of sampling functions are clustered patterns associated with a region of interest, wherein said magnitude of an intensity is equivalent to an integral value of the scene across said pixel locations; and, wherein said integral value comprises a spot measurement of the electromagnetic radiation emanating from region of interest of the scene at said wavelength band.

4. A method for using a single-pixel imager for spatial scene reconstruction, the method comprising:

in response to a light filtering device comprising an array of imaging elements being configured to filter incoming light according to a series of spatial patterns corresponding to a series of sampling functions that enable spatial scene reconstruction;

said light filtering device includes a transmissive filter having a first membrane, a second membrane, and a variable gap therebetween;

measuring, using a single photodetector of a single-pixel imager, a magnitude of an intensity of said filtered light across pixel locations in said spatial pattern, said magnitude corresponding to an integral value across said pixels;

in response to said transmissive filter being configured to tune a variable dimension of said gap:

correlating distinct said gaps to respective distinct wavelength band transmissions;

wherein said first membrane includes a first reflective coating and said second membrane includes a second reflective coating, said first reflective coating and said second reflective coating face one another with said gap therebetween;

wherein said tuning of said gap defines a dimension having a resultant associated wavelength band transmission for controlling multi-spectral imaging; and, wherein said associated wavelength band transmission is controlled by said gap and a first selected gap defines a first wavelength band of said wavelength band transmission to said single photodetector.

5. The method of claim 4, further comprising:

measuring, using said photodetector, a magnitude of multiple intensities corresponding to the light being filtered by different spatial patterns; and, reconstructing a spatial appearance of a scene from said measurements to obtain the spatially reconstructed scene.

6. The method of claim 4, wherein at least a second selected gap defines at least a second wavelength band of said wavelength band transmission to same said single photodetector.

7. A method for using a single-pixel imager to reconstruct the spatial appearance of a scene, the method comprising:

configuring a light filtering device comprising an array of imaging elements to a spatially varying optical filtering process of incoming light according to a series of spatial patterns corresponding to a series of sampling functions that enable spatial reconstruction of an image of the scene;

said light filtering device is a transmissive filter;

measuring, using a photodetector of the single-pixel imager, a magnitude of an intensity of said filtered light across pixel locations in said series of spatial patterns;

reconstructing an image of the scene from a sequence of intensity values;

wherein said transmissive filter is a Fabry-Perot (F-P) filter;

said F-P filter having a first membrane, a second membrane, and a first variable gap therebetween;

tuning a controller for manipulating a variable dimension of said first variable gap;

measuring, using said photodetector of a single-pixel imager, a magnitude of an intensity of said filtered light across said active pixels;

wherein said tuning of said controller and said first variable gap defines a dimension having a resultant associated wavelength band transmission for controlling multi-spectral imaging;

wherein said associated wavelength band transmission is controlled by said first variable gap and defines a first wavelength band of said wavelength band transmission to said photodetector; and, wherein a second wavelength band transmission is controlled by a second variable gap and defines a second wavelength band of said wavelength band transmission to said photodetector.

8. The method of claim 7, wherein said first membrane includes a first reflective coating and said second membrane includes a second reflective coating, said first reflective coating and said second reflective coating face one another with said variable gap therebetween.

9. The method of claim 7, wherein said measurement being equivalent to integrating across said active pixels to generate an integral value thereof, said integral value comprising a spot measurement of said localized area.

* * * * *